United States Patent

[11] 3,607,927

[72] Inventor Alvin B. Stiles
  Wilmington, Del.
[21] Appl. No. 834,890
[22] Filed June 19, 1969
[45] Patented Sept. 21, 1971
[73] Assignee E. I. du Pont de Nemours and Company
  Wilmington, Del.
  Continuation-in-part of application Ser. No. 596,817, Nov. 25, 1966, now Patent No. 3,489,787, which is a continuation-in-part of application Ser. No. 293,156, July 5, 1963, now Patent No. 3,334,143, dated Aug. 7, 1967, which is a continuation-in-part of application Ser. No. 2,802, Jan. 18, 1960, now abandoned.

[54] PROCESS FOR THE OXIDATION OF ALKENES TO UNSATURATED ACIDS AND ALDEHYDES USING A SILVER-CADMIUM CATALYST
  4 Claims, No Drawings

[52] U.S. Cl. .................................................... 260/533 N, 252/475, 260/604 R
[51] Int. Cl. ....................................................... C07c 57/04
[50] Field of Search .......................................... 260/533 N

[56] References Cited
  UNITED STATES PATENTS
  2,837,473  6/1958  McCormack et al. ........ 252/467

Primary Examiner—James A. Patten
Assistant Examiner—Richard D. Kelly
Attorney—John R. Powell ABSTRACT: Unsaturated aldehydes, unsaturated acids, or mixtures thereof are prepared in good yield from alkenes having 3–4 carbon atoms using a nonporous silver-cadmium alloy catalyst containing 1% to 15%, by weight of cadmium.

PROCESS FOR THE OXIDATION OF ALKENES TO UNSATURATED ACIDS AND ALDEHYDES USING A SILVER-CADMIUM CATALYST

CROSS-REFERENCE TO RELATED APPLICATIONS

This application is a continuation-in-part of my copending application Ser. No. 596,817, filed Nov. 25, 1966 now U.S. Pat. No. 3,489,787 which in turn is a continuation-in-part of my then copending application Ser. No. 293,156 filed July 5, 1963 now U.S. Pat. No. 3,334,143, issued Aug. 7, 1967, which was in turn a continuation-in-part of my then copending application Ser. No. 2,802, filed Jan. 18, 1960, now abandoned.

BACKGROUND OF THE INVENTION

This invention relates to silver catalysts and is more particularly directed to uniform, nonporous silver catalysts which contain small amounts of cadmium and to selective oxidation processes employing such catalysts.

Silver catalysts have heretofore been widely used as selective oxidation catalysts. They have been used for example in the oxidation of methanol to produce formaldehyde and in a variety of other reactions of organic compounds which involve oxidation often accomplished by dehydrogenation.

I have found that the inclusion of a small amount of cadmium uniformly distributed throughout nonporous silver catalysts effects better in conversion in organic oxidation processes without loss of yield.

Silver catalysts are already in wide use for oxidation processes and porous silver-cadmium alloys have been found suitable for some oxidations; MacCormack et al. U.S. Pat. No. 2,837,473. However, activity of such alloys was dependent on porosity. I have discovered that uniform, nonporous silver-cadmium alloys give better results than those normally obtained with silver catalysts, and surprisingly give better results than porous alloys.

SUMMARY OF THE INVENTION

The present invention is directed to a process for oxidizing alkenes having 3-4 carbon atoms to unsaturated aldehydes, unsaturated acids, or mixtures thereof using a uniform, nonporous silver-cadmium alloy catalyst containing from 1% to 15%, by weight, of cadmium.

DESCRIPTION OF THE INVENTION

The silver-cadmium catalysts used in the process of this invention can be made in any convenient manner and ordinarily an alloy with silver and cadmium will be prepared simply by fusing the two components together in the desired proportions. Alternatively, finely divided powders of the two metals can be brought together and sintered to form what is, still, essentially an alloy.

Preparation of catalysts by such processes results in a smooth nonporous alloy in which the cadmium is uniformly distributed throughout the silver.

The amount of cadmium can vary from about 1% to 15% by weight based upon the weight of silver. Amounts much less than 1% ordinarily will not produce effects of any significant magnitude. Above 15% the directivity of the catalysts falls off and the catalyst additionally becomes lower melting.

The silver catalysts of the invention can be prepared in any convenient physical form of the types heretofore used for silver. Thus, the silver-cadmium alloys can be formed as wire, as silver gauze, as machine turnings, or as pellets. Additionally the silver can be supported upon various carriers in conventional manner, it being sufficient for the purpose of the invention that the uniform, nonporous silver alloy be able to contact the organic materials to be oxidized.

The preferred catalysts for use in the process of this invention are silver-cadmium alloys containing from 4% to 10% cadmium based on the weight of silver. Such amounts of cadmium are most consistent in producing high conversion without loss of yield.

ALKENES TO BE OXIDIZED

The alkenes which can be oxidized according to the process of this invention are those having 3-4 carbon atoms, such as propene, butene, and isobutene.

The alkenes are oxidized to the aldehydes or acids or mixtures thereof under those conditions normally used to oxidize alkenes to aldehydes or acids. In general, the oxidation takes place in the presence of air or some other oxygen source at temperatures of from 350° C. to 750° C. Ordinarily as the temperature is increased the proportion of aldehyde in the oxidation product increases, up to a temperature in excess of 750° C. At such elevated temperatures oxidation becomes increasingly nondirective and carbon dioxide and water are produced predominantly. As the amount of oxygen available to the reaction increases, the proportion of acid in the oxidation product also increases. However, this tendency is also limited to below that point at which increased oxygen causes excessive overoxidation to carbon dioxide and water. The oxidation will proceed, generally speaking, according to the following exemplary equations:

(1)

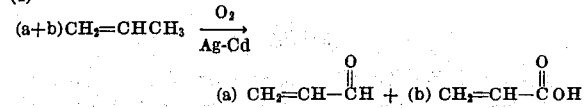

(2)

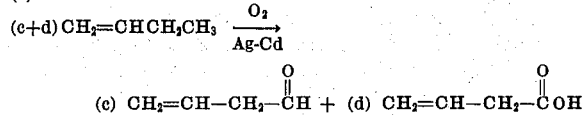

The following example illustrate the invention. Parts and percentages are by weight unless otherwise stated.

EXAMPLE 1

Preparation of Catalysts

This example illustrates the preparation of a suitable catalyst. 190 parts of pure silver are fused at 1,000° C. with 10 parts of metallic cadmium. The resulting uniform ingot can be shaped into any convenient physical form such as wire filaments approximately 0.01 inch in diameter.

EXAMPLE 2

Propene is oxidized to a mixture of acrylic acid and acrolein when a mixture of 7 volume percent oxygen, 14 volume percent propene, and 79 volume percent nitrogen is passed at 400° C. and a space velocity of 45,000 over a uniform nonporous catalyst having a composition of 85% silver and 15% cadmium. Conversion per pass is 55% of the propene and the yield of acrolein and acrylic acid totals 64% of the reacted propene.

Of the 64% acrolein and acrylic acid, 37% is acrolein and 27% acrylic acid. When the temperature is increased to 550° C. and the space velocity to 100,000 the conversion to acrolein and acrylic acid is 67% with 41% acrolein and 26% acrylic acid. Thus the proportion of acrolein produced, in relation to acrylic acid can be increased by operating at a higher temperature. A similar effect is achieved by decreasing the volume percent of oxygen with respect to the volume percent of propene.

EXAMPLE 3

Isobutene is oxidized to a mixture of methacrylic acid and methacrolein by passing a gas mixture of 7 volume percent oxygen, 10 volume percent isobutene and 83 volume percent nitrogen at 650° C. and a space velocity of 225,000 over a uniform nonporous catalyst having a composition of 94% silver and 6% cadmium. Conversion per pass is 74% of the isobutene and the yield to methacrylic acid and methacrolein is 67% of the reacted isobutene. Of the 67% product, methacrolein is 40% and the remaining 27% is methacrylic acid.

PRECAUTION

In examples 2 and 3, it is understood that adequate means must be taken to control the temperature near the value specified. It should also be pointed out that when the gas mixtures are in the explosive range, adequate mixing and control devices must be provided to avoid uncontrolled flame propagation.

What is claimed is:

1. In a process for the preparation of a mixture unsaturated aldehyde and, unsaturated acid, from a 3 to 4 carbon alkene, by the catalytic oxidation in the presence of oxygen using a silver catalyst, the improvement comprising using as the silver catalyst a uniform, nonporous silver-cadmium alloy consisting essentially of silver which contains from 1% to 15%, by weight, of cadmium.

2. The process of claim 1 wherein the catalyst consists essentially of silver which contains from 4% to 10% by weight, of cadmium.

3. The process of claim 1 wherein the alkene is propene.

4. The process of claim 1 wherein the alkene is butene.